United States Patent

Yoneda et al.

[11] 4,319,549
[45] Mar. 16, 1982

[54] SECONDARY AIR SUPPLY SYSTEM

[75] Inventors: Kenji Yoneda, Fujisawa; Fumio Sanezawa, Yokosuka; Yasuo Takagi; Yuji Ushijima, both of Yokohama, all of Japan

[73] Assignee: Nissan Motor Company, Yokohama, Japan

[21] Appl. No.: 46,310

[22] Filed: Jun. 7, 1979

[30] Foreign Application Priority Data

Jun. 16, 1978 [JP] Japan .................................. 53-72848

[51] Int. Cl.³ .......................... F02F 1/34; F02B 75/10
[52] U.S. Cl. ................................. 123/198 E; 60/278; 181/204
[58] Field of Search .............. 123/198 E; 60/278, 281, 60/312; 181/204

[56] References Cited

U.S. PATENT DOCUMENTS 2,798,470 7/1957 Kiekhaefer .......................... 181/204
3,966,014 6/1976 Gowing .......................... 123/198 E
4,172,362 10/1979 Mizuno et al. .......................... 60/278

*Primary Examiner*—Raymond A. Nelli
*Attorney, Agent, or Firm*—Schwartz, Jeffery, Schwaab, Mack, Blumenthal & Koch

[57] ABSTRACT

A reed type valve is operatively secured on the outer surface of the casing of an engine air filter assembly to supply the exhaust system of an engine with secondary air. The reed valve is fluidly connected to an air induction passage formed interior of the casing of the air filter assembly. A resonance chamber is also formed interior of the casing and communicated through a communication passage with the air induction passage so as to attenuate a relatively low frequency component of exhaust noise transmitted through the reed valve. The air induction passage, resonance chamber and communication passage are formed as follows:

$$2 \leq S_o < 5, S \leq S_o \leq 5, \frac{330}{M} S_o < V < \frac{1300}{M} S_o,$$
$$\frac{48}{M} \frac{S}{S_o} < l < \frac{188}{M} \frac{S}{S_o}$$

where,
$S_o(cm^2)$ = the cross-sectional area of the air induction passage
$S(cm^2)$ = the cross-sectional area of the communication passage
$l(cm)$ = the length of the communication passage
$V(cm^3)$ = the volume of the resonance chamber
$M$ = the number of the engine cylinders of the engine.

7 Claims, 19 Drawing Figures

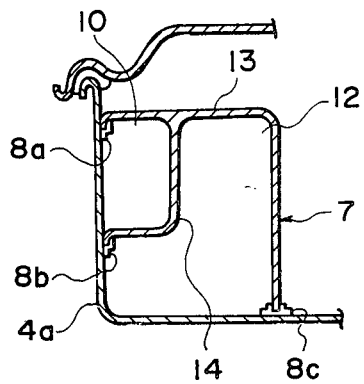
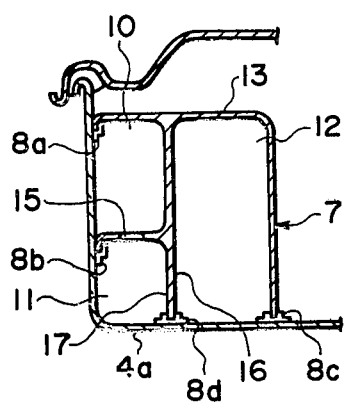
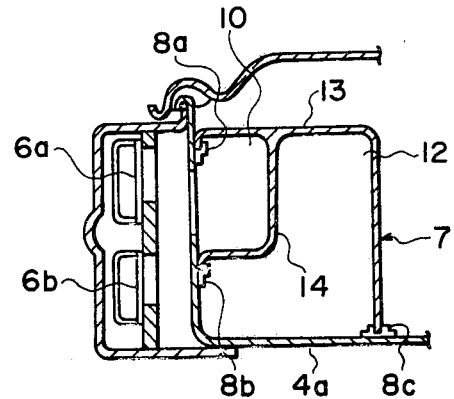
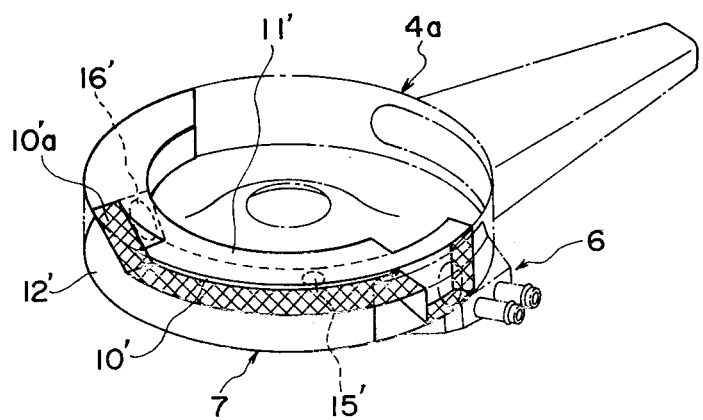

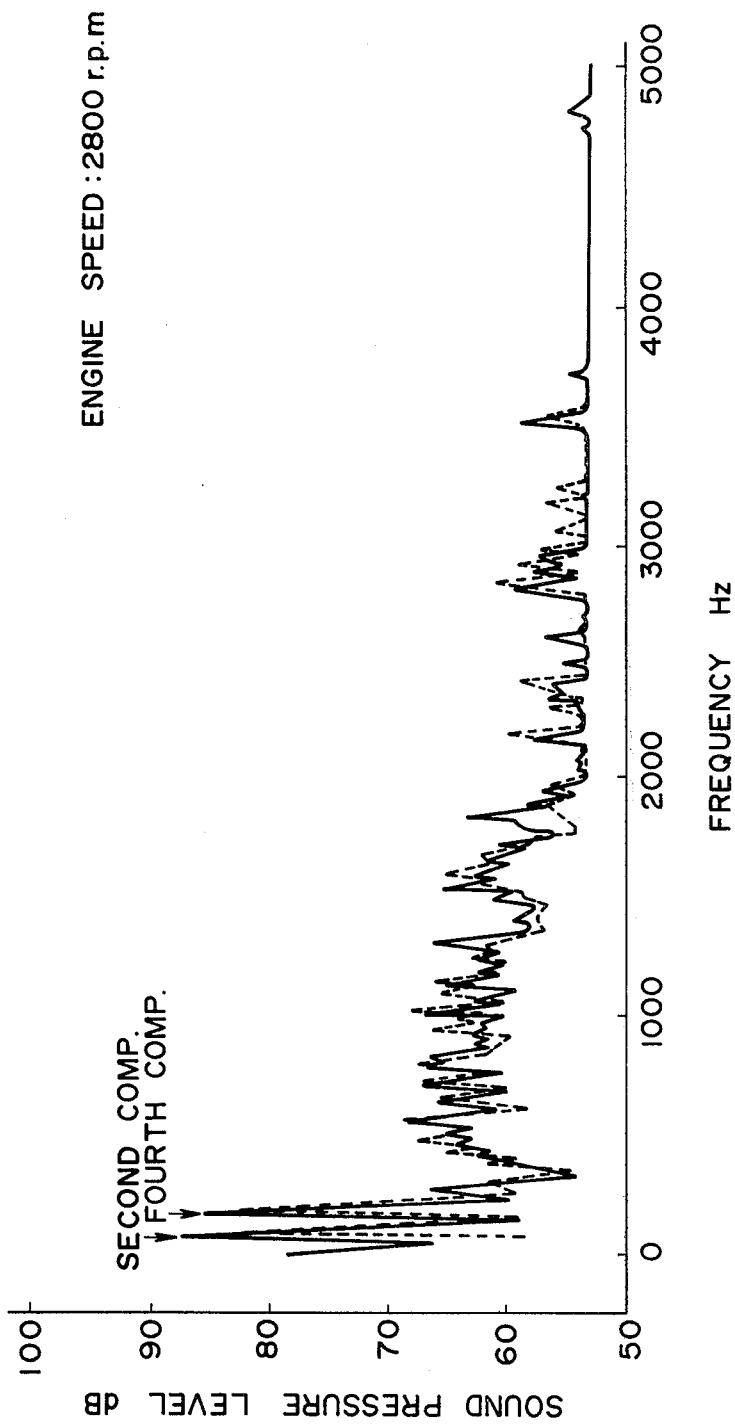

TEST CONDITIONS
ENGINE SPEED :1400 r.p.m
ENGINE LOAD :5kg-m
AIR-FUEL RATIO :15.0:1
EGR :NIL $$\lambda = \frac{(CO + CO_2) \text{ AID ON}}{(CO + CO_2) \text{ AID OFF}}$$

SECONDARY AIR SUPPLY SYSTEM

BACKGROUND OF THE INVENTION

This invention relates to a system for supplying supplemental air into the exhaust system of an internal combustion engine, and more particularly to an improvement in the same system of the type wherein the supplemental air is inducted into the exhaust system by the action of exhaust pressure pulsation generated in the exhaust system.

In connection with internal combustion engines provided with exhaust systems of the type wherein unburnt constituents in exhaust gases are burnt to discharge clean exhaust gases into the atmosphere, it is well known that supplemental air is supplied to the exhaust system to support burning of the unburnt constituents in the exhaust gases. This supplemental air is, in general, called "secondary air" and accordingly is referred to as "secondary air" hereinafter. It is also known in the art, that the atmospheric air as the secondary air is intermittently induced into the exhaust system by using a reed-type check valve or reed valve which is operated by the action of exhaust pressure pulsation generated in the exhaust system.

However, a secondary air supply system using such a reed valve has been encountered the difficulties in which exhaust noise is transmitted through a secondary air supply passage back toward the reed valve and then the exhaust noise is radiated into a passenger compartment to produce uncomfortable sound.

The experiments by the inventors revealed that the exhaust noise having the frequency ranging from 60 to 120 Hz is predominant in a four-cylinder engine, and the exhaust noise having the frequency ranging from 100 to 175 Hz is predominant in a six-cylinder engine. It will be understood that the main parts of such exhaust noises are within a relatively low frequency range.

In this regard, it has now been in practice to mount a reed valve on the body of an engine air filter and form a tail pipe of the check valve along the inner wall surface of the body of the air filter, in order to decrease the exhaust noise.

However, such a tail pipe serving as an air induction passage is unavoidably limited in length and the cross-sectional area in due consideration of the inner space of the air filter and the necessary amount of secondary air. Accordingly, the exhaust noise within a low frequency range cannot sufficiently dissipated althrough the exhaust noises within medium and high frequency ranges can be dissipated to a considerable extent.

Otherwise, in order to decrease the exhaust noise, it has also been proposed to increase the cross-sectional area of a part of a secondary air induction passage to form a so-called expansion chamber for dissipation of the exhaust noise. In this case, a considerably long expansion chamber is required to dissipate low frequency noise. However, it is difficult to form such a long expansion chamber in view of the space in the engine room.

In this regard, it has also been proposed to decrease the cross-sectional area of a part of the air induction passage to increase the noise siliencing effect. However, with such a proposition, the flow resistance of the inducted air is increased to decrease the amount of secondary air inducted in the exhaust system, unavoidably lowering the cleaning effect to the unburnt constituents in the exhaust gases.

SUMMARY OF THE INVENTION

The present invention contemplates to solve the problems in the various conventional secondary air supply systems, by directing the inventors' attentions to the fact that the noise level of the exhaust noise is considerably high within a particular frequency range, and making their efforts to dissipate the exhaust noise with such a particular frequency range.

It is an object of the present invention to provide an improved secondary air supply system using a reed valve for an internal combustion engine, by which exhaust noises emitted to a passenger compartment through the reed valve is effectively silenced, inducting a sufficient amount of secondary air into the exhaust system of the engine.

It is another object of the present invention to provide an improved secondary air supply system using a reed valve for an internal combustion engine, in which exhaust noise in medium and high frequency ranges is attenuated by a relatively long air induction passage connected to the reed valve, and exhaust noise in low frequency range is attenuated by a resonance chamber communicated with the air induction passage.

It is a further object of the present invention to provide an improved secondary air supply system using a reed valve for an internal combustion engine, in which an air induction passage and a resonance chamber are formed as a unit which is detachably disposed interior the casing of an engine air filter, so that the secondary air supply system becomes simple in construction and accordingly can be easily produced.

These and other objects, features and advantages of the secondary air supply system according to the present invention will become more apparent from the following description when taken in conjunction with the accompanying drawings in which like reference numerals represent like parts and elements.

BRIEF DESCRIPTION OF THE DRAWINGS

FIG. 3 is a cross-sectional view taken in the direction of the arrows substantially along the line I—I of FIG. 2;

FIG. 4 is a cross-sectional view taken in the direction of the arrows substantially along the line II—II of FIG. 2;

FIG. 5 is a cross-sectional view taken in the direction of the arrows substantially along the line III—III of FIG. 2;

FIG. 6 is a perspective view showing another example of the silencer assembly disposed within an engine air filter;

FIG. 10 is a graph showing the relationship between the sound pressure level and the frequency at the engine speed of 2,800 r.p.m. in cases with an air inducing device (AID) and without the AID;

DESCRIPTION OF THE PREFERRED EMBODIMENTS

Figure 1:
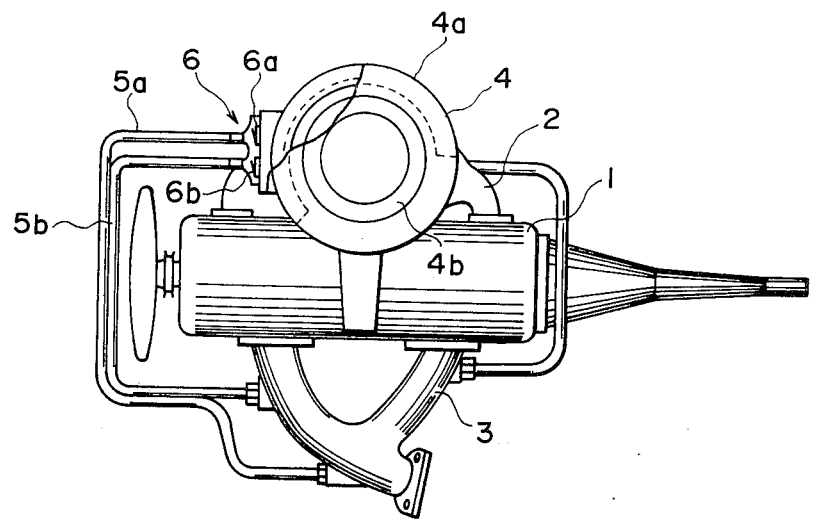
FIG. 1 is a schematic representation showing a secondary air supply system in accordance with the present invention, in cooperation with an internal combustion engine.

Referring now to FIGS. 1 to 5 inclusive of the drawings, a preferred embodiment of a secondary air supply system in accordance with the present invention is shown in combination with an internal combustion engine which is, in this case, of an automotive vehicle. The engine 1 is provided with an intake manifold 2 which is connectable to the engine cylinders (not identified) of the engine 1 to supply intake air into the cylinders. An exhaust manifold 3 is provided to fluidly connectable with the engine cylinders to discharge exhaust gases therethrough out of the engine 1. An engine air filter 4 is provided to be fluidly connectable with the intake manifold 2 to the filter atmospheric air to be inducted into the intake manifold 2.

A reed-type check valve assembly 6 or reed valve assembly is secured to the casing 4a of the air filter 4. The reed valve 6 comprises two reed valves 6a, 6b each of which is provided with a flexible valve leaf (no numeral). The reed valve 6 is fluidly connected with the exhaust manifold 3 through two secondary air induction pipes 5a and 5b.

Figure 2:
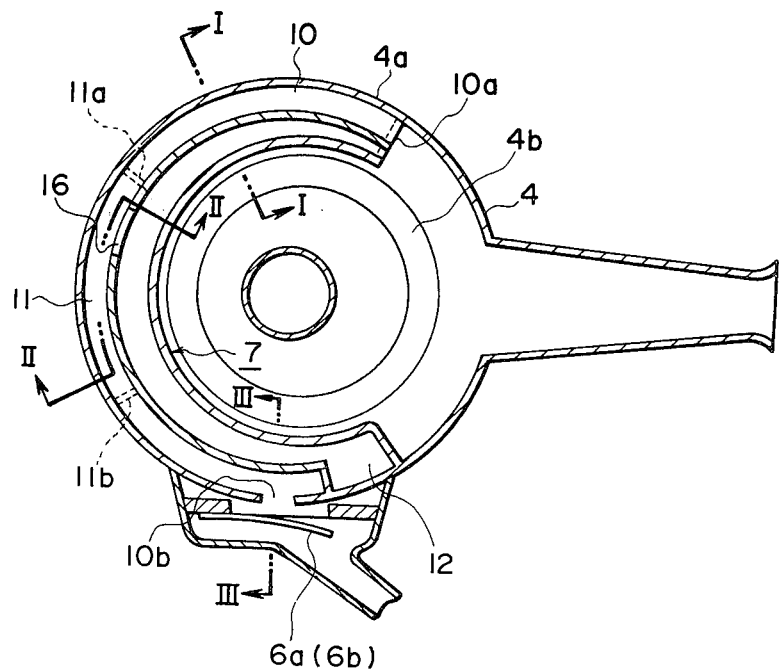
FIG. 2 is a cross-sectional view of an essential part of the secondary air supply system according to the present invention, showing an example of a silencer assembly disposed within an engine air filter.

An example of a silencer assembly 7 is disposed interior of the casing 4a of the air filter 4 and upstream of the reed valves 6a, 6b. It is to be noted that the silencer assembly 7 is located between the inner wall surface of the air filter casing 4a and an annular filter element 4b or filter medium. The silencer assembly 7, in this instance, is an integrally formed structure which is made of a plastic and secured to the inner wall surface of the air filter casing through securing pieces 8a, 8b and 8c as clearly shown in FIGS. 3 to 5, and the silencer assembly 7 is easily detachable. The silencer assembly 7 is formed therein with an air induction passage 10 as a tail pipe to dissipate the exhaust noise in medium and high frequency ranges. The air induction passage 10 is formed with air inlet 10a which is opened to the interior of the air filter casing 4a, and an air outlet 10b which is formed through the wall of the air filter casing 4a and opened to the interior of the reed valve 6 as shown in FIG. 2. The air induction passage 10 is communicated through a communication passage or chamber 11 with a resonance chamber 12 for dissipating the exhaust noise in low frequency range, as clearly seen from FIG. 4.

As shown, the air induction passage 10 is defined by a wall member 13, a partition wall member 14 and the inner wall surface of the air filter casing 4a. Accordingly, the induction passage 10 is located at an upper portion of the silencer assembly 7 and in contact with the inner wall surface of the air filter casing 4a. The partition member 14 separates the interior of the silencer assembly 7 into the air induction passage 10 and the resonance chamber 12. The communication chamber 11 is located, as shown in FIG. 4, under the air induction passage 10 and communicates the air induction passage 10 through opening 15 formed through the partition wall member 14. The communication chamber 11 further communicates the resonance chamber 12 through an opening 16 formed through a partition member 17 which is secured through a securing piece 8d to the inner wall surface of the filter casing 4a. The communication chamber 11 is defined between two partition wall members 11a and 11b as clearly seen from FIG. 2. It is to be noted that the air induction passage 10 is communicated through the communication chamber 11 with the resonance chamber 12, constituting a kind of Helmholtz resonator.

With the thus arranged secondary air supply system, when the reed members of the reed valves 6a, 6b are operated to be opened and closed by the action of exhaust pressure pulsation generated in the exhaust manifold 3, air is inducted through the air induction passage 10 and the reed valves 6a, 6b into the air induction pipes 5a and 5b. The air introduced into the air induction pipes 5a and 5b are then supplied to the exhaust manifold 3 to burn the unburnt constituents in the exhaust gases passing through the exhaust manifold 3.

Otherwise, although the exhaust noise is transmitted through the reed valves 6a, 6b back to the silencer assembly 7, the medium and high frequency components of the exhaust noise are dissipated by the air induction passage 10 and low frequency component of the exhaust noise is dissipated by the resonance effect of the resonance chamber 12.

FIG. 6 illustrates another preferred embodiment of the another example shown in FIGS. 2 to 5 with the exception that the resonance chamber 12' is formed under the air induction passage 10' and the communication chamber 11'. As shown, the air inlet 10a' of the air induction passage 10' opens upward. The communication chamber 11' is located parallel with the air induction passage 10' and communicates through the opening 15' with the air induction passage 10' and through the opening 16' with the resonance chamber 12'. It will be understood that the air induction passage 10' is communicated with the reed valve 6.

Figure 7A:
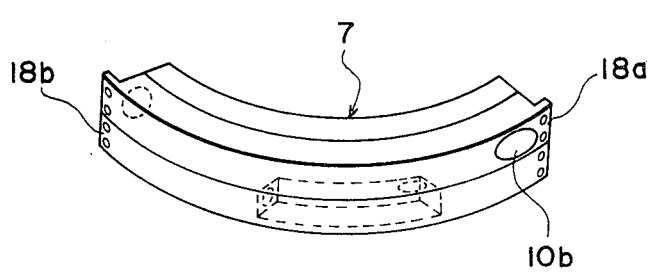
FIG. 7A is a perspective view of a further example of the silencer assembly to be secured to the inner wall surface of an engine air filter.
Figure 7B:
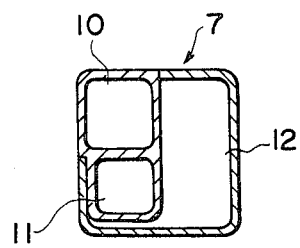
FIG. 7B is a cross-sectional view of the silencer assembly of FIG. 7A.
Figure 8A:
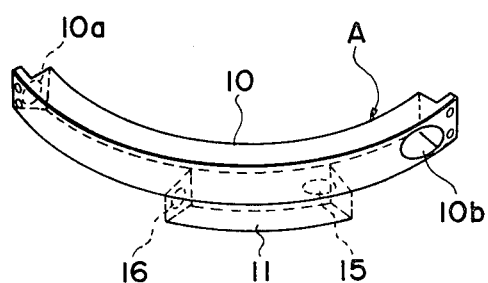
FIG. 8A is a perspective view of a counterpart of the silencer assembly of FIG. 7A.
Figure 8B:
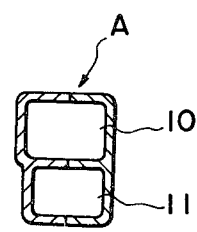
FIG. 8B is a cross-sectional view of the counterpart of FIG. 8A.

FIGS. 7A and 7B illustrate a further example of the silencer assembly 7 which is similar to the example shown in FIGS. 2 to 5 with the exception that the silencer assembly 7 is securely disposed in the interior of the air filter casing 4a in a manner that the flange portions 18a and 18b are secured to the inner wall surface of the air filter casing 4a with small screws (not shown) to be disposed through openings (no numerals) formed through the flange portions 18a and 18b.

In this case, the silencer assembly 7 is constructed by combining a first integral member A shown in FIGS.

Figure 9A:
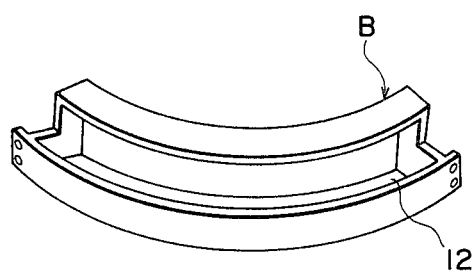
FIG. 9A is a perspective view of another counterpart of the silencer assembly of FIG. 7A.
Figure 9B:
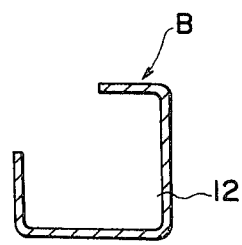
FIG. 9B is a cross-sectional view of the another counterpart of FIG. 9A.

8A and 8B and a second integral member B shown in FIGS. 9A and 9B. The first integral member A is formed to include therein the air induction passage 10 and the communication chamber 11. The second integral member B is formed to include therein the resonance chamber 12. It will be understood that the combined first and second integral members A and B form a closed type silencer assembly 7, for example, by means of adhesion with each other. It is to be noted that it is sufficient to obtain a gas-tight seal between the reed valve assembly 6 and a portion of the member A in close proximity to the air outlet 10b.

Referring to FIGS. 10 to 16, the exhaust noise emitted through the reed valve 6 will be now discussed in detail hereinafter.

The experiments revealed that the maximum noise levels lie in an engine speed range from 1100 to 1500 r.p.m. and an engine speed range from 2,300 to 3,000 r.p.m. It will be understood that such exhaust noise with the maximum noise levels are of low frequency. Since such a low frequency exhaust noise is emitted through the reed valves 6a, 6b to the atmosphere and therefore exhaust noise which has the frequency in proportion to the opening and closing timings of the reed valves 6a, 6b is predominant.

The opening and closing timings of the reed valve 6a(6b) corresponds to the frequency of the exhaust pressure pulsation and accordingly is given by the equation below:

$$v = (M \cdot N/60 \times 2) \quad (1)$$

where,
v = the frequency of exhaust pressure pulsation
M = the number of engine cylinders
N = engine speed (r.p.m.)

Figure 11:
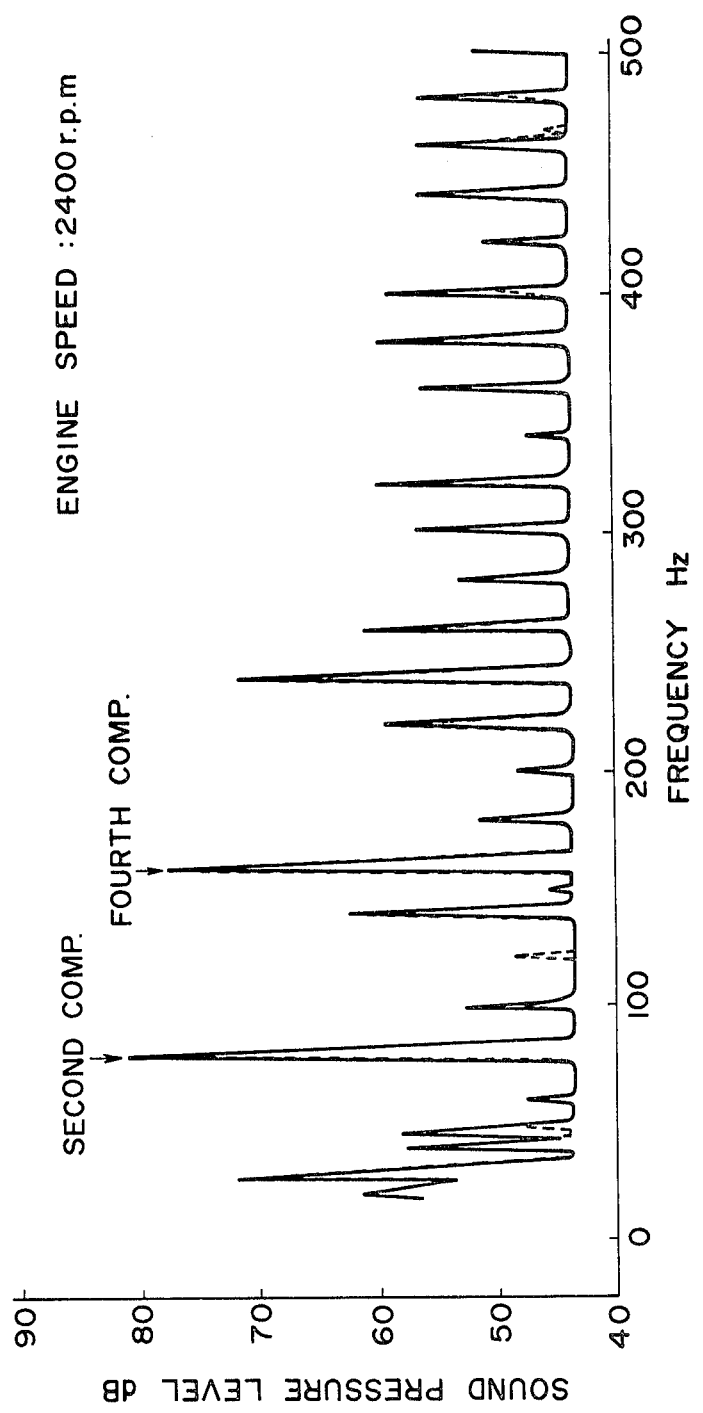
FIG. 11 is a graph similar to FIG. 10, but at the engine speed of 2,400 r.p.m. in cases with the AID and without the AID.
Figure 12:
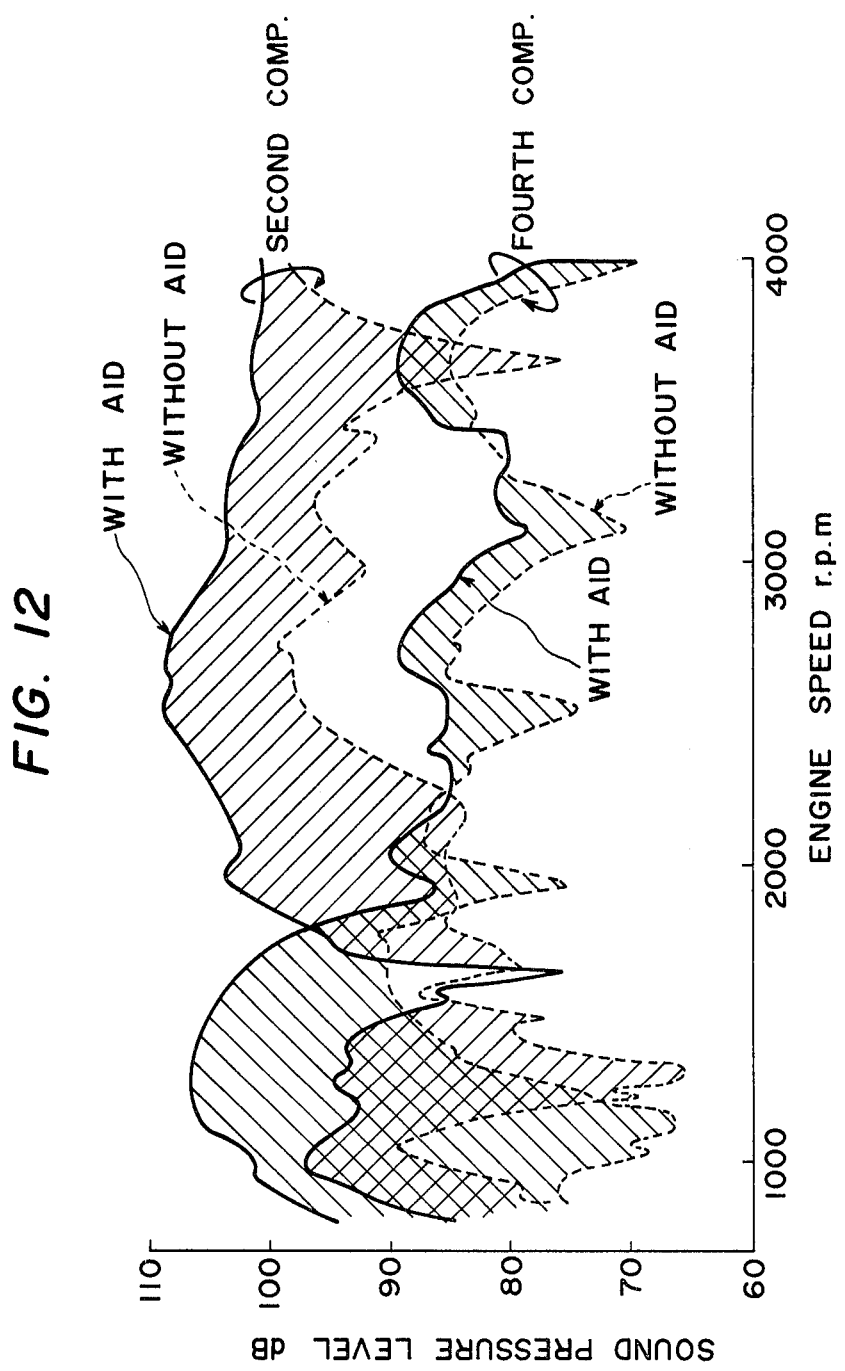
FIG. 12 is a graph showing the relationship between the sound pressure level and the engine speed in cases with the AID and without the AID.

Accordingly, in case of a four-cylinder internal combustion engine, the equation (1) becomes $v = 2 \cdot N/60$ and therefore the sound pressure level of a noise component (called the second component) having the frequency whose number corresponds to two times the engine speed (per moment). As shown in FIGS. 10 and 11 in which a solid curve indicates the sound pressure level (in measured value) in case with an air inducing device (AID) for inducing secondary air into the exhaust system by a read valve and a dotted curve indicates the same level in case without the same air inducing device, the experiments revealed that the sound pressure level of a noise component (called the fourth component) having the frequency whose number corresponds to four times the engine speed (per moment) as well as in the above-mentioned second component. As seen from FIG. 12 in which solid curves indicate the cases with the air inducing device and dotted curves indicate the cases without the air inducing device, the second component is predominant at an engine speed range over 1,800 r.p.m., but the fourth component is predominant at an engine speed range below 1,800 r.p.m. It was found that the sound pressure level peak of the fourth component at the engine speed range of 1,100 to 1,500 r.p.m. and the sound pressure level peak of the secondary component at an engine speed range of 2,300 to 3,000 r.p.m. lie in approximately same range in frequency. Actually, according to equation (1), the frequency (v) of the fourth component becomes about 75 to 100 Hz, and the frequency (v) of the second component becomes 75 to 100 Hz.

Hence, it will be understood that the second and fourth components of the exhaust noise can be simultaneously decreased by diminishing the frequencies of the noise ranging from 75 to 100 Hz in case of the four-cylinder engine. In general, it is sufficient to diminish the frequency of the noise ranging from 18.75M to 25M (Hz) when the number of the engine cylinders is M.

Figure 15:
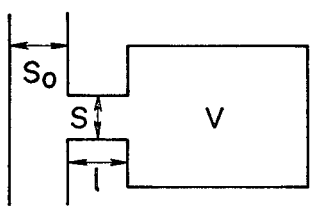
FIG. 15 is a diagrammatic illustration showing the dimentions of silencer assembly of the present invention.

In view of the above, the present invention contemplates to diminish the above-mentioned particular range of frequency of the exhaust noise by the resonance effect of a kind of Helmholtz resonator which is schematically represented in FIG. 15 in which its resonant frequency fr and a diminished sound level Z are given by the following equations:

$$fr = \frac{C}{2\pi} \sqrt{\frac{S}{Vl}} \quad (2)$$

$$Z = 10 \log_{10} \left[ 1 + \frac{\frac{SV}{l}}{4S_o^2 \left(\frac{f}{fr} - \frac{fr}{f}\right)^2} \right] \quad (3)$$

where
C = the speed of the sound
S = the cross-sectional area of a neck portion
l = the length of the neck portion
V = the volume of a resonance chamber
f = the frequency of noise
$S_o$ = the cross-sectional area of an air induction passage.

In accordance with the above equations (2) and (3), the various specifications of the resonator will be decided in relation to the particular frequency range to be dimished.

With respect to the cross-sectional area $S_o$ of the air induction passage 10: In order to obtain a required amount of the secondary air supplied to the exhaust system, the cross-sectional area is set within a following range from the experimental result shown in FIG. 14:

$$2 \leq S_o \leq 5 \text{ (cm}^2\text{)} \quad (4)$$

Figure 14:
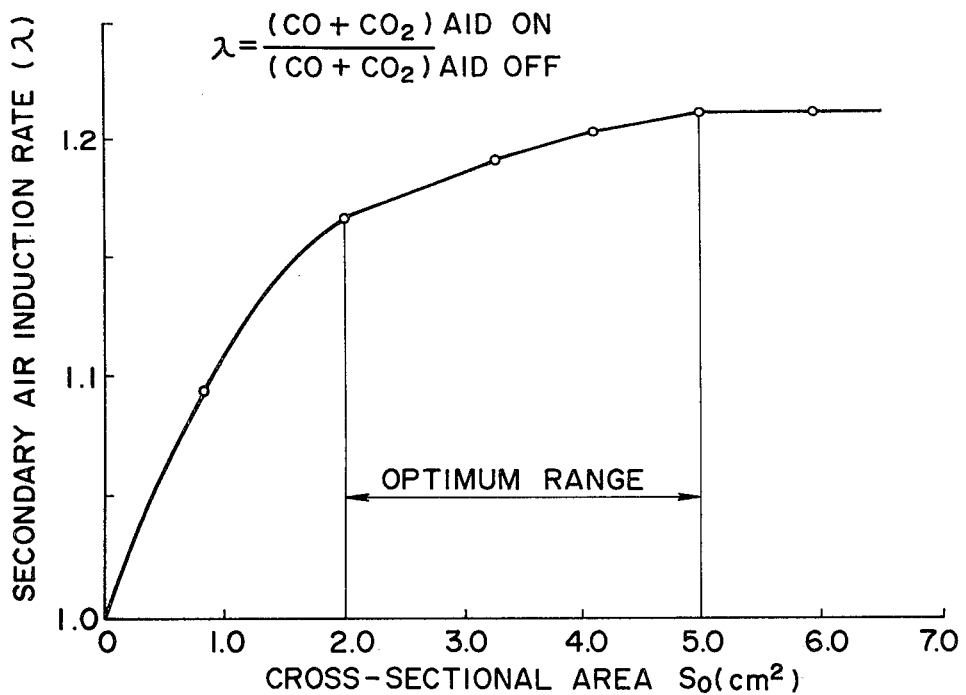
FIG. 14 is a graph showing the optimum range of the cross-sectional area of an air induction passage of the secondary air supply system in accordance with the present invention.

In FIG. 14, "AID ON" represents the case in which the above-mentioned air inducing device is operated to induce air into the exhaust system of the engine, and "AID OFF" represents the case in which the air inducing device is not operated to stop air induction into the exhaust system. Accordingly, secondary air induction rate (λ) is the sum of the concentration of carbon monoxide (CO) and carbon dioxide ($CO_2$) in the exhaust gases when the AID is operated/the concentration of the sum of CO and $CO_2$ in the exhaust gases when the AID is not operated.

As appreciated above, the silencing effect to midium and high frequency ranges of noises is deteriorated within a range of $S_o > 5$.

With respect to the cross-sectional area S of the neck portion: the minimum cross-sectional area of the communication passage 11 is the same as or less than the cross-sectional area $S_o$ of the air induction passage as indicated below:

$$S \leq S_o \leq 5 \text{ (cm}^2\text{)} \quad (5)$$

Now, the equation (3) is changed as follows:

$$\sqrt{\frac{SV}{l}} = 2S_o \sqrt{10^{\frac{z}{10}} - 1} \cdot \left| \frac{f}{fr} - \frac{fr}{f} \right| \quad (6)$$

Additionally, the equation (2) is rearranged by substituting the numerical values such as the speed of sound as follows:

$$\sqrt{\frac{S}{Vl}} = 1.848 \times 10^{-4} fr \quad (7)$$

From the equations (6) and (7), the following equation is derived:

$$V = 1.082 \times 10^4 S_o \sqrt{10^{\frac{z}{10}} - 1} \cdot \left| \frac{f}{fr^2} - \frac{1}{f} \right| \quad (8)$$

Now, in case of the four-cylinder internal combustion engine, the frequency range to be diminished is $75 \leq f \leq 100$ (Hz) as mentioned above and accordingly the resonance frequency should be $75 \leq fr \leq 100$ (Hz).

On this fact, the diminished sound level Z becomes minimum at the both end values of the range of f and consequently the diminished sound levels Z at $f=75$ (Hz) and $f=100$ (Hz) should be took into consideration. Assuming that V is $V_1$ when $f=75$ (Hz) and the diminished sound level is Z(dB), and V is $V_2$ when $f=100$ (Hz) and the diminished sound level is Z(dB), the following equations are obtained:

$$\begin{cases} V_1 = 1.082 \times 10^4 S_o \sqrt{10^{\frac{z}{10}} - 1} \cdot \left| \frac{75}{fr^2} - \frac{1}{75} \right| & (9) \\ V_2 = 1.082 \times 10^4 S_o \sqrt{10^{\frac{z}{10}} - 1} \cdot \left| \frac{100}{fr^2} - \frac{1}{100} \right| & (10) \end{cases}$$

The maximum levels of $V_1$ and $V_2$ lie at $fr=100$ (Hz) and $fr=75$ (Hz), respectively, and their values are as follows:

$$V_1 max = 63.1 S_o \sqrt{10^{\frac{z}{10}} - 1} \quad (11)$$

$$V_2 max = 84.2 S_o \sqrt{10^{\frac{z}{10}} - 1} \quad (12)$$

The value of fr at $V_1 = V_2$ becomes 86.6 (Hz). Accordingly, $$V_1 = V_2 = 36.0 S_o \sqrt{10^{\frac{z}{10}} - 1} \quad (13)$$

The diminished sound level is 8 to 12 (dB) and consequently the following values are obtained from the above equations (11), (12) and (13) when $Z=8$ (dB):

$$\begin{cases} V_1 \text{ max} = 145.4 S_o \\ V_2 \text{ max} = 193.7 S_o \\ V_1 = V_2 = 82.9 S_o \end{cases}$$

The same values at $Z=12$ (dB) become as follows:

$$\begin{cases} V_1 \text{ max} = 243.1 S_o \\ V_2 \text{ max} = 324.4 S_o \\ V_1 = V_2 = 138.9 S_o \end{cases}$$

Figure 16:
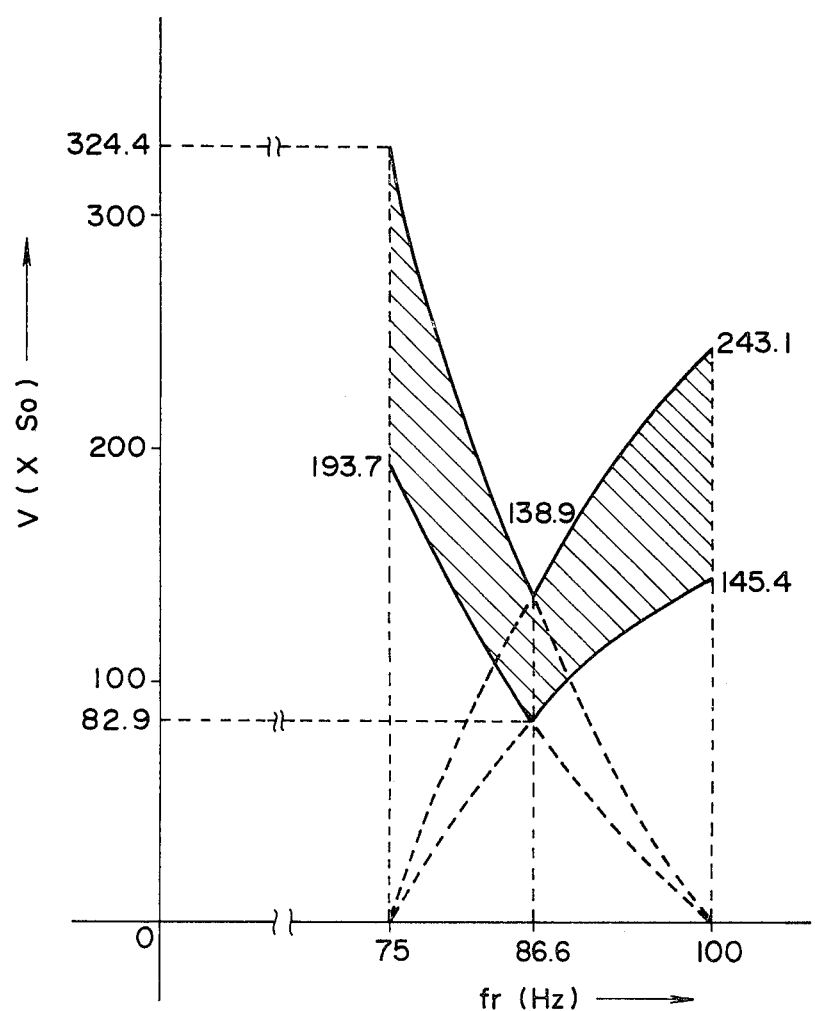
FIG. 16 is a graph showing the relationship between resonant frequency (fr) and the volume (v) of a resonance chamber of the silencer assembly of the present invention.

With the thus obtained values, V at the diminished sound level of 8 to 12 dB fall within the range oblique-lined in the graph of FIG. 16. Accordingly, $$82.9 S_o \leq V \leq 324.4 S_o \quad (14)$$

The equation (14) is modified taking into consideration of the engine cylinder number M, as follows:

$$(331.6/M)S_o \leq V \leq (1297.6/M)S_o \quad (15)$$

The equation (15) is modified by rounding the numbers as follows:

$$(330/M)S_o \leq V \leq (1300/M)S_o \quad (15')$$

Now, a range of l will be given from the equations (6) and (7) eliminating V. The range of l can be obtained similarly to the range of V.

From the equations (6) and (7), the following equation is given:

$$\frac{S}{l} = 3.696 \times 10^{-4} \times S_o \sqrt{10^{\frac{z}{10}} - 1} \cdot \left| f - \frac{fr^2}{f} \right| \quad (16)$$

It will be understood that, in case of four-cylinder internal combustion engine, $75 \leq f \leq 100$ (Hz), and $75 \leq fr \leq 100$ (Hz).

Assuming that $\alpha = S/l$ is $\alpha_1$ when $f=75$ and the diminished sound level is z(dB), and $\alpha = S/l$ is $\alpha_2$ when $f=100$ (Hz) and the diminished sound level is Z(dB), the following equations are given:

$$\alpha_1 = 3.696 \times 10^{-4} \times S_o \sqrt{10^{\frac{z}{10}} - 1} \left| 75 - \frac{fr^2}{75} \right| \quad (17)$$

$$\alpha_2 = 3.696 \times 10^{-4} \times S_o \sqrt{10^{\frac{z}{10}} - 1} \left| 100 - \frac{fr^2}{100} \right| \quad (18)$$

The maximum values of $\alpha_1$ and $\alpha_2$ lie at $fr=100$ (Hz) and $fr=75$ (Hz), respectively, and accordingly their values are as follows:

$$\alpha_1 \text{ max} = 2.156 \times 10^{-2} \times S_o \sqrt{10^{\frac{z}{10}} - 1} \quad (19)$$

$$\alpha_2 \text{ max} = 1.617 \times 10^{-2} \times S_o \sqrt{10^{\frac{z}{10}} - 1} \quad (20)$$

The value of fr is 86.6 (Hz) when $\alpha_1 = \alpha_2$ and the value is given as follows:

$$\alpha_1 = \alpha_2 = 9.238 \times 10^{-3} \times S_o \sqrt{10^{\frac{z}{10}} - 1} \quad (21)$$

Since the diminished sound level is within the range from 8 to 12 (dB), the following values at Z=8 (dB) are given from the equations (19), (20) and (21):

$$\begin{cases} \alpha_1 \max = 4.968 \times 10^{-2} S_o \\ \alpha_2 \max = 3.726 \times 10^{-2} S_o \\ \alpha_1 = \alpha_2 = 2.129 \times 10^{-2} S_o \end{cases}$$

The same values become at Z=12 (dB) as follows:

$$\begin{cases} \alpha_1 \max = 8.303 \times 10^{-2} S_o \\ \alpha_2 \max = 6.231 \times 10^{-2} S_o \\ \alpha_1 = \alpha_2 = 3.560 \times 10^{-2} S_o \end{cases}$$

$$\therefore 2.129 \times 10^{-2} S_o \leq \alpha \leq 8.308 \times 10^2 S_o$$

$$2.129 \times 10^{-2} S_o \leq \frac{S}{l} \leq 8.308 \times 10^2 S_o$$

$$\therefore 12.04 \frac{S}{S_o} \leq l \leq 46.97 \frac{S}{S_o} \quad (22)$$

The equation (22) is changed taking into consideration of the engine cylinder number M, as follows:

$$(48.16/M) \cdot (S/S_o) \leq 1 \leq (187.88/M) \cdot (S/S_o) \quad (23)$$

When the numbers of the equation (23) is rounded, $$(48/M) \cdot (S/S_o) \leq 1 \leq (188/M) \cdot (S/S_o) \quad (23')$$

In view of the above, it is preferable to form l of the communication chamber within the range of the equation (23').

It will be appreciated that, in case of six-cylinder internal combustion engine, such a calculation is carried out on M=6 so as to dissipate the sound pressure levels of a noise component (called the third component) having the frequency whose number corresponds to three times the engine speed (per moment) and a noise component (called the sixth component) having the frequency whose number corresponds to six times the engine speed (per moment).

Figure 13:
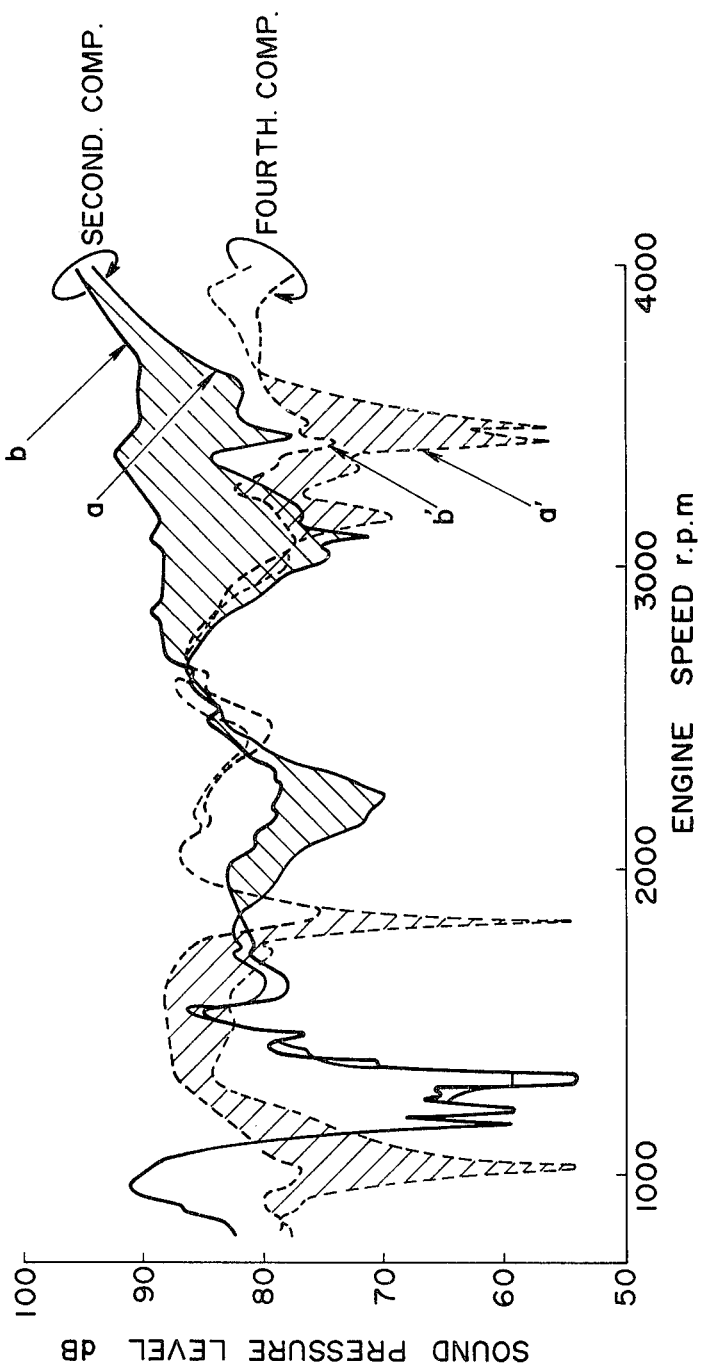
FIG. 13 is a graph similar to FIG. 12, but in cases of the present invention and of a conventional technique.

As a result, the exhaust noise in a relatively low frequency range and transmitted through the reed valve is introduced into the resonance chamber 12 through the communication chamber 11 and therefore the vibration energy of the exhaust noise is dissipated by the resonance effect of the resonance chamber 12 to significantly attenuate the exhaust noise emitted out of the silencer assembly in accordance with the present invention. As seen from FIG. 13, the attenuation effect of the secondary air supply system according to the present invention to both the second and fourth components of the exhaust noise is remarkedly excellent as compared with a conventional secondary air supply system without a kind of Helmholtz resonator which is connected to the air induction passage of the secondary air supply system. In FIG. 13, lines a and a' indicate cases of the secondary air supply system according to the present invention and lines b and b' indicate the cases of the conventional secondary air supply system.

Furthermore, the exhaust noises in medium and high frequency ranges can be effectively silenced in the air induction passage which exhibits the attenuation effect to the noises of such ranges, serving as a kind of tail pipe of the reed valve.

As appreciated from the foregoing, according to the present invention, the exhaust noises transmitted through the reed type check valve is effectively silenced without decreasing the amount of secondary air introduced into the exhaust system of the engine. Besides, the silencer assembly 7 can be easily attached interior the casing of the air filter, and the production cost of the silencer assembly 7 can be lowered.

What is claimed is:

1. A secondary air supply system for use with an internal combustion engine comprising:

an engine air filter for filtering intake air to be inducted to the engine, said air filter having a casing;

a reed valve operative in response to the exhaust pressure pulsations generated in the exhaust system of the engine to induct secondary air therethrough to the exhaust system;

means for defining an air induction passage inside said casing of said engine, said air induction passage being in communication with said reed valve so that air is inducted through said air induction passage into the exhaust system upon opening of said reed valve, said air induction passage comprising a first silencer means for attenuating the exhaust noises in medium and high frequency ranges;

means for defining a resonance chamber inside said casing of said engine air filter, which chamber comprises a second silencer means for attenuating the exhaust noises in low frequency range; and means for defining a communication passage through which said resonance chamber is in direct communication with said air induction passage, said communication passage being located inside said casing of said engine air filter, said air induction defining means, said resonance chamber and said communication passage include an integrally formed member which is detachably disposed interior of and along the inner wall surface of the casing of said engine air filter.

2. A secondary air supply system as claimed in claim 1, in which the sizes of said air induction passage, resonance chamber and communication passage are as follows:

$$2 \leq S_o \leq 5, \ S \leq S_o \leq 5, \ \frac{330}{M} S_o < V < \frac{1300}{M} S_o,$$

$$\frac{48}{M} \frac{S}{S_o} < l < \frac{188}{M} \frac{S}{S_o}$$

where,
$S_o$ = the cross-sectional area (cm$^2$) of said air induction passage
$S$ = the cross-sectional area (cm$^2$) of said communication passage
$l$ = the length (cm) of said communication passage
$V$ = the volume (cm$^3$) of said resonance chamber
$M$ = the number of engine cylinders of the engine.

3. A secondary air supply system as claimed in claim 2, in which said reed valve is secured to the casing of the air filter and being capable of providing communication between the exhaust system of the engine and said air induction passage.

4. A secondary air supply system as claimed in claim 3, wherein said integrally formed member being formed with an air outlet opened to said reed valve to introduce air admitted into said air induction passage into the exhaust system of the engine through said reed valve.

5. A secondary air supply system as claimed in claim 4, in which said integrally formed member is made of plastics.

6. A secondary air supply system as claimed in claim 5, in which said integrally formed member is located between the inner wall surface of the air filter casing and an air filter element.

7. A secondary air supply system as claimed in claim 3, in which said means for defining said resonance chamber includes a first integrally formed member, and said means defining said air induction passage and communication passage includes a second integrally formed member, said first and second integrally formed members being sealingly connectable to each other to form a silencer assembly which is detachably disposable interior and along the inner wall surface of the air filter casing, said second integrally formed member being provided with an air outlet opened to said reed valve to introduce air admitted into said air induction passage into the exhaust system of the engine through said reed valve.

* * * * *